United States Patent Office 3,649,561
Patented Mar. 14, 1972

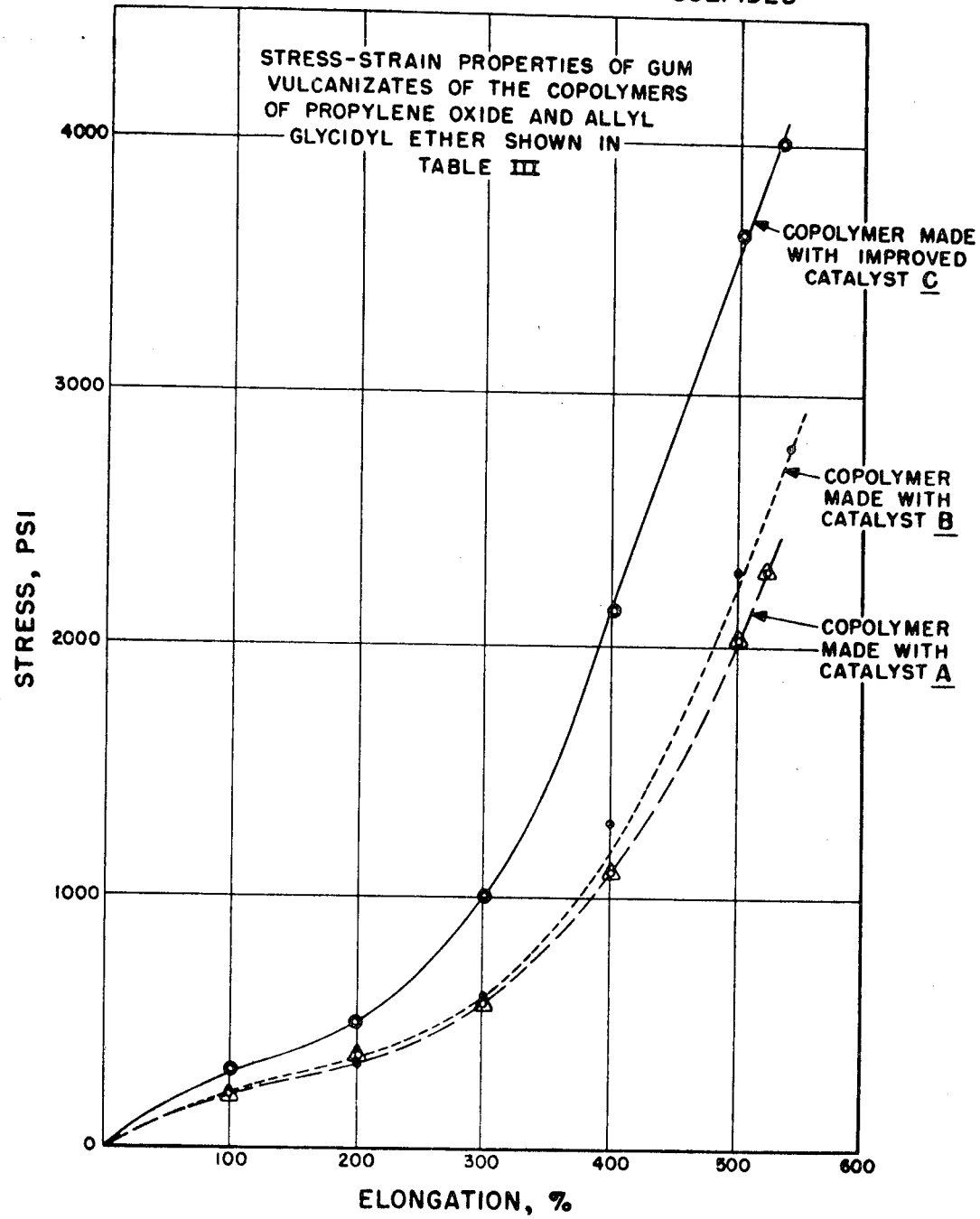

3,649,561
CATALYST FOR MAKING HIGH MOLECULAR WEIGHT STEREOREGULAR POLYMERS FROM OLEFIN OXIDES AND SULFIDES
Joginder Lal, Akron, Ohio, assignor to The Goodyear Tire & Rubber Company, Akron, Ohio
Original application Dec. 18, 1968, Ser. No. 784,773, now Patent No. 3,632,784, dated Jan. 4, 1972. Divided and this application Feb. 13, 1970, Ser. No. 14,896
Int. Cl. C08g 23/06, 23/14
U.S. Cl. 252—431 R    5 Claims

ABSTRACT OF THE DISCLOSURE

An olefin oxide or sulfide polymerization catalyst consisting of a mixture of (I) the metal-containing reaction product of an alcohol, phenol or mercaptan with a compound having the formula

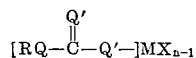

and (II) MR''$_n$, wherein

R is monovalent hydrocarbon, oxyhydrocarbon or thiohydrocarbon containing up to 10 carbon atoms,
R'' is monovalent hydrocarbon containing up to 14 carbon atoms,
Q is oxygen or sulfur,
Q' is oxygen or sulfur and at least one Q' in each molecule is sulfur,
M is Zn, Cd, Mg or Al,
$n$ is the valence of M, and
X is monovalent halide, alkoxy, thioalkyl or

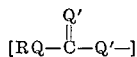

This is a division of application Ser. No. 784,773 filed Dec. 18, 1968.

This invention relates to an improved process for polymerizing olefin oxides and olefin sulfides, to the novel catalyst system employed and the novel polymers prepared therefrom.

SYMBOLS

In the specification and claims, the following symbols are employed for brevity to represent the chemical substances indicated hereinafter:

R represents monovalent hydrocarbon, oxyhydrocarbon or thiohydrocarbon radical containing up to 10 carbon atoms;
R' represents R or hydrogen;
R'' represents a monovalent hydrocarbon radical containing up to 14 carbon atoms
Q represents oxygen or sulfur;
Q' represents oxygen or sulfur and at least one Q' in each molecule is sulfur;
M represents Zn, Cd, Mg or Al
$n$ represents the valence of M
X represents a monovalent halide, alkoxy, thioalkyl or hydrocarbon radical, or the radical represented by the formula

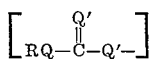

BACKGROUND

A variety of catalysts are known to be capable of polymerizing alkylene oxide monomers. Examples of such known catalysts are metal halides, metal halide-alkylene oxide complexes, metal, akoxides, carbonates of the alkaline earth metals, and metal alkyl compounds in combination with water, organic alcohols, sulfur or oxygen. More recently, applicant has disscovered that excellent catalysts for this purpose are produced by reacting (A) an alcohol, phenol or mercaptan and (B) a compound represented by the formula

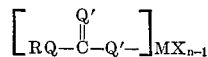

The preparation and use of these catalysts are described in U.S. Pat. 3,409,565 which is incorporated herein by reference.

PRESENT INVENTION

Applicant has now discovered that these latter catalysts are further improved by mixing them with an organometallic compound having the general formula MR''$_n$. The resulting catalysts yield polymers of higher molceular weight and/or high stereo-regularity than the polymers obtained in the absence of the organometallic compound. This result is unexpected since it is well known that these same organometallic compounds alone are poor catalysts for alkylene oxides or alkylene sulfides. Polymers of propylene oxide prepared by the use of this catalyst system yield gum vulcanizates having tensile strength values in excess ot 3500 p.s.i.

MONOMER

In its broad scope, the subject invention reveals a novel catalyst and method for polymerizing compounds represented by the general formula

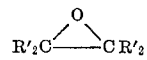

and broadly referred to as epoxides and episulfides, and particularly those materials known as oxirane

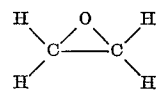

and thiirane

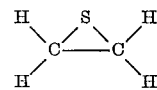

and the mono-, di-, tri- and tetrasubstituted derivatives thereof, to form high molecular weight polymers. Representative examples of radicals which may be substituents of oxirane and thiirane in the practice of this invention are: alkyl (especially alkyl having up to 10 carbon atoms), alkenyl, cycloalkyl, aryl, aralkyl, alkoxyalkyl, alkenoxyalkyl, akoxy and alkenoxy radicals.

Representative examples of derivatives of oxiranes are: propylene oxide, 1-butene oxide, 2-butene oxide (cis or trans), styrene oxide, 3-phenyl-1,2-epoxypropane (benzyl ethylene oxide), 3,3,3-trifluoro-1,2-epoxypropane, epichlorohydrin, butadiene monoxide, 1,2-epoxy-3-ethoxypropane, 1,2-epoxy-3-phenoxypropane, 1,2-epoxy-3-(p-chlorophenoxy) propane, 1,2-epoxy-3-alloyloxypropane (allyl glycidyl ether), 4,5-epoxy - 1 - hexene, 1,1,2 - trimethyl ethylene oxide, and 1,1,2-tetramethyl ethylene oxide.

Representative examples of substituted thiirane monomers suitable for use in practicing my invention are: propylene sulfide, 1-butene sulfide, styrene sulfide, butadiene monosulfide, 1,1,2,2-tetramethyl ethylene sulfide, and 3,3,3-trifluoro-1,2-epithiopropane.

CATALYST

The novel catalyst employed in the practice of this invention is prepared by mixing together:

(I) The metal-containing reaction product of (A) an alcohol, phenol or mercaptan and (B) a compound represented by the formula II. $MR''_n$.    $[RQ-\overset{\overset{Q'}{\|}}{C}-Q'-]MX_{n-1}$, and An essential functional group in component I(B) of the catalyst of this invention is at least one monovalent radical $$[RQ-\overset{\overset{Q'}{\|}}{C}-Q'-]$$

bonded to M. The nature of the remaining portion of the structure, represented by X supra and satisfying the unused valence(s) of M may be varied. Generally, however, X will consist of monovalent radicals examples of which include halide, alkoxy, thioalkyl and hydrocarbon radical, and the radical represented by the formula $$[RQ-\overset{\overset{Q'}{\|}}{C}-Q'-]$$

It will be obvious to those skilled in the art that, since R, M and X can each represent a number of radicals as previously defined, in the various formulas shown above these substituent radicals can be substituted in many combinations and thus produce a wide variety of compounds without departing from the spirit of the invention. Similarly, di- or trihydroxy compounds can be used in preparing the above classes of catalyst.

The reaction between the two components I(A) and I(B) employed in forming the reaction product portion (Component I) of the catalyst of the invention may be accomplished by direct mixing and heating or by adding the Component I(B) to heated alcohol, phenol or mercaptan. The components may be reacted in the presence of an inert diluent such as benzene or toluene. If the metal-containing reaction product separates out, it can be isolated by filtration or by centrifuging it. If no such precipitate forms, the entire reaction mixture may be precipitated in excess precipitating hydrocarbon such as petroleum ether, isooctane, pentane, etc. Alternately, the entire reaction mixture may be evaporated to dryness. The dried mass should be free of unreacted alcohol, phenol, or mercaptan. To accomplish this, it may be washed with a suitable organic solvent such as, for example, isooctane, pentane, benzene or toluene and subsequently dried under vacuum.

The reaction between the two components I(A) and I(B) may be carried out at atmospheric, subatmospheric or superatmospheric pressure. Atmospheric pressure is most convenient. The appropriate temperature will vary to some degree depending upon the alcohol, phenol, or mercaptan and the other component employed. Generally this will be in the range of about 25° C. to 300° C. and most frequently between about 80° C. and 130° C.

In $MR''_n$ the R'' groups may be the same or different. Examples of organometallic compounds which may be used in preparing catalysts of this invention are: diethylzinc, di-n-butylzinc, triethylaluminum, triisobutylaluminum, tri-n-decylaluminum, tri-n-tetradecylaluminum, tricyclohexylaluminum, triphenylaluminum, diethylphenylaluminum, diethylbenzylaluminum, dimethylcadmium, diethyl cadmium, diphenylmagnesium, diethylmagnesium, and dicyclopentadienylmagnesium.

The molar ratio of alcohol, phenol or mercaptan (Component I(A)) to the metal compound (Component I(B)) may vary from 0.1 to 100, preferably from 1 to 20.

The catalyst of this invention is preferably preformed by mixing component I with component II. As stated before, component I represents the metal-containing reaction product of the components I(A) and I(B). The atomic ratio of the metal in the component I to the metal in the component II employed in preparing the catalyst of the present invention may vary between 0.05 and 10 and preferably between 0.2 and 5. To obtain maximum activity, it is desirable to finely disperse component I in a suitable inert medium such as mineral oil or a hydrocarbon solvent and then treat it with the required amount of component II in an inert atmosphere. If it is desired to prevent or minimize settling down of the heterogeneous catalyst, the viscosity of the hydrocarbon solvent used for making the dispersion may be increased by predissolving a small amount of a high molecular weight polymer such as a polymer of the monomer to be polymerized.

While the amount of catalyst employed in the practice of this invention is not critical, a sufficient amount must be used to provide the desired catalytic effect. Satisfactory results are obtained by employing from 0.001 to 50 grams of catalyst (Component I plus Component II) per liter of monomer and optimum results are achieved when from 0.05 to 10 grams per liter are used.

In polymerizing the monomer, the reaction temperature may be varied over a wide range; for instance, from about −10° C. to about 200° C. It has been found that a temperature of 0° C. to 100° C. is convenient for carrying out polymerizations.

As is well understood with polymerization reactions of this type, the reaction time generally increases with decreasing temperature, although other commonly understood factors also influence the polymerization rate. While the process may be conducted at supra-atmospheric, as well as subatmospheric pressures, such as are frequently utilized for polymerization reactions, it is an advantage of the subject invention that the process may be performed with good results either very near to or at atmospheric pressure.

The polymerization should generally be conducted in an inert ambient in accordance with conventional polymerization technique. Suitable for this purpose would be an atmosphere of any known gas, such as nitrogen, argon, helium; or a vacuum.

The polymerization process of this invention may be carried out either in bulk or in an inert solvent or suspending medium. For this purpose any common aromatic, cycloaliphatic, aliphatic hydrocarbon, halogenated hydrocarbon or ether may be used; as, for example, benzene, toluene, cyclohexane, heptane, hexane, pentane, chlorobenzene, dichlorobenzene, carbon tetrachloride, diethyl ether, tetrahydrofuran and the like. Nitro compounds such as nitrobenzene can also be employed. Benzene has been found to be generally suitable for this purpose.

POLYMERS

The polyepoxides and polyepisulfides produced in the practice of the subject invention are high molecular weight polymers which may be crystalline or amorphous solids, or rubbery materials. In addition to the polymers formed by polymerizing monomers of the general type disclosed, the catalyst of the subject invention may be used to form saturated copolymers thereof as well as unsaturated, vulcanizable copolymers. Examples of the saturated copolymers would be the copolymers of ethylene oxide and propylene oxide or ethylene sulfide and propylene sulfide. A vulcanizable copolymer would result, for example, from polymerizing allyl glycidyl ether and propylene oxide monomers; or vinyl cyclohexene oxide and 1-butene oxide monomers; or cyclooctadiene monoxide and propylene oxide monomers; or by dicyclopentadiene monoxide and propylene oxide monomers. As is well understood in the art, the unsaturated monomer is employed in minor amounts up to about 20 parts per hundred parts of the total monomer, and the saturated monomer is employed in major amounts of more than 80 parts per hundred parts of the total monomer. Other examples of the sulfide copolymers would result from the copolymerization of butadiene monosulfide and propylene sulfide. An example of a halo-substituted copolymer is that formed by the copolymerization of epichlorohydrin and propylene oxide. More complicated interpolymers are also envisioned as falling within the scope of this invention. For example, to control crystallinity, to improve vulcanizability or otherwise modify and improve the polymers made by this process it may be beneficial to use one or more than one saturated epoxide monomer in conjunction with one or more unsaturated epoxide monomers; e.g. the product obtained by copolymerizing ethylene oxide, propylene oxide and allyl glycidyl ether monomers; or propylene oxide, styrene oxide and allyl glycidyl ether monomers; or propylene oxide, allyl glycidyl ether and vinyl cyclohexene oxide monomers.

The vulcanizable elastomers produced by my invention may be compounded and processed by normal procedures known in the art. They are readily compounded with fillers such as carbon black and with antioxidants and other conventional compounding materials. The unsaturated elastomers are readily vulcanized with the aid of conventional sulfur plus accelerator vulcanizing systems appropriate for the degree of unsaturation in the elastomer.

High molecular weight polymer chains may possess a molecular structure leading to either a substantially crystalline or substantially amorphous (non-crystalline) state of matter. Conversely a polymer chain may be composed of alternate blocks of crystallizable and non-crystallizable segments. If a polymer is a physical blend of substantially crystalline and substantially amorphous polymers, the crystalline fraction may be separated from the amorphous fraction by dissolving the latter in a suitable solvent. Acetone at 25° C. has been found to be a convenient solvent for separating crystalline poly(propylene oxide) from amorphous poly(propylene oxide). The acetone-insoluble fraction will be large if the polymer contains a large percentage of substantially crystalline material. If the crystalline and amorphous sequences are in the form of stereoblocks, the polymer will also yield a large percentage of acetone-insoluble fraction. A distinguishing feature of the two types of polymers is their swelling ratio in acetone. The stereoblock fraction will exhibit a high degree of swelling, usually in excess of 7, whereas the crystalline fraction exhibits a significantly lower swelling ratio.

The poly(propylene oxide) produced by the process of the present invention has an inherent viscosity in the range of about 6 to 15 and contains approximately 35–80 percent acetone insoluble material. The swelling ratio of these polymers lies in the range of 2 to 6, more particularly in the range of 3 to 5. This swelling ratio is significantly higher than the value reported in the literature which is less than one for poly(propylene oxide) prepared with ferric chloride/propylene oxide complex catalyst. The polymer obtained with the latter catalyst system usually contains substantial amounts, sometimes as much as 65 percent, of low molecular weight, substantially amorphous material which can be detrimental for many physical properties. The acetone-insoluble fraction of such a polymer is a high crystallinity resin and is devoid of elastomeric properties.

A novel feature of the present invention is that unfractionated poly(propylene oxide) prepared by the process of the invention can be vulcanized with a suitable peroxide plus sulfur curing recipe to yield gum vulcanizates which exhibit tensile strength in excess of 3500 p.s.i., elongation at break in excess of 450 percent, and 300% modulus in excess of 600 p.s.i. Dicumyl peroxide is an example of a peroxide suitable for the above vulcanization. If propylene oxide is polymerized only with Component I catalyst of this invention, the gum vulcanizates obtained with a peroxide plus sulfur curing recipe exhibit significantly lower tensile strength of about 2400 p.s.i. and 300% modulus of about 400–500 p.s.i.

It will be appreciated by persons skilled in the art that copolymerizing propylene oxide with 2–20 mole percent of another oxirane monomer, for instance, allyl glycidyl ether, will generally decrease the crystallinity of the resulting copolymer. The crystallinity of such a copolymer and its swelling ratio will depend on the nature and mole percent of the second monomer. Copolymers of propylene oxide prepared with 2–10 mole percent of allyl glycidyl ether using the polymerization catalysts of this invention have inherent viscosity of 6–12, acetone-insolubility of 25–75 and swelling ratio in excess of 6. A distinguishing feature of these unsaturated copolymers is that their gum vulcanizates obtained with a suitable accelerator-sulfur curing recipe exhibit gum tensile strength in excess of 3500 p.s.i., elongation at break in excess of 450% and 300% modulus in excess of 450 p.s.i. Such high tensile strength values for gum vulcanizates prepared from unfractionated unsaturated copolymers of propylene oxide have not been reported.

EXAMPLES

The practice of this invention is illustrated by reference to the following examples which are intended to be representative rather than restrictive of its scope. As employed in this specification inherent viscosity ($\eta$) is defined as the natural logarithm of the relative viscosity at 30° C. divided by the polymer concentration for an 0.05 to 0.10 percent (w./v.) solution in benzene containing 0.1 percent phenyl 2-naphthylamine (PBNA) and expressed in units of dl./g. Percent insolubility in acetone was determined at 25° C. after immersion in acetone for 72 hours by placing one gram of sample in 200 ml. of acetone. The acetone solvent was changed after 24, 48 and 72 hours. The swollen sample was weighed and subsequently dried under vacuum to determine the weight of insoluble fraction. From the same measurement, swelling ratio of the acetone-insoluble fraction was calculated as the ratio of the weight of acetone in the swollen sample to the weight of the acetone-insoluble material. [Some investigators have used the term "swelling value" to define the swelling behavior of the acetone-insoluble fraction. The swelling value represents the ratio of the weight of the swollen sample to its weight after drying to constant weight. Therefore, swelling ratio=swelling value −1.]

Unless stated otherwise, all polymerization reactions were conducted in a nitrogen atmosphere according to the following general procedure wherein all parts are by weight unless otherwise noted. Into a clean, dry, glass bottle flushed with nitrogen was added the required amounts of monomer and solvent (if desired) through a serum cap, followed by transfer of catalyst consisting of a preformed mixture of component I and component II. Alternately, the required amount of component I and component II were injected into the bottle and subsequently monomer and solvent were transferred. Thereafter, the serum cap was replaced by a metal cap having a Teflon liner and the bottle was tumbled in a 50° C. water bath for the designated time period. Polymerization was terminated by the addition of 20 parts of methanol containing 0.2 percent PBNA stabilizer. The resultant polymer was initially aspirator dried for 24 hours and subsequently dried under 2 mm. torr for approximately 68 hours at 40° C. Where the polymer is insoluble in methanol, as for instance, in the case of the propylene sulfide or phenyl glycidyl ether polymer, the polymerization mixture was precipitated in excess methanol containing 0.2 percent PBNA followed by the drying procedure outlined above. In the examples to follow, the polymer yields have not been corrected for catalyst residues.

EXAMPLE I

Into a one-quart bottle was transferred 400 ml. dry toluene, 200 ml. high purity 2-dimethylaminoethanol, and 80 g. recrystallized zinc n-butyl xanthate. The bottle was screw-capped and suspended in a water bath kept at 90° C.

A clear homogenous solution was obtained within a few minutes. The reaction was allowed to proceed for two hours, during which interval a golden-yellow precipitate formed. After cooling, the reaction mixture was transferred into 2500 ml. isooctane and stirred thoroughly. The precipitate was filtered. It was stirred thoroughly with about 3-liter benzene using a magnetic stirrer to remove any unreacted zinc butyl xanthate and filtered. This step was repeated once more. The precipitate, twice-washed with benzene, was dried under vacuum to yield 31 grams of a golden-yellow powder [Component I]. Analysis: sulfur, 22.05%; zinc, 42.85%.

A 3.3 g. portion of the dried powder isolated above was transferred to a 4-ounce bottle. Fifteen dried porcelain balls were then transferred to the bottle, followed by 50 ml. of dry benzene. The bottle was screw-capped tightly and placed on a roller for 16 hours. To the bottle was added under nitrogen 1.04 g. (1.25 ml.) of bulk triethylaluminum [Component II]. The dispersion was allowed to age at room temperature for 3 days. The atomic ratio of aluminum to zinc in the resulting catalyst was 0.42:1.

EXAMPLE 2

To 815 g. (11.0 moles) of high purity n-butyl alcohol, maintained at 80° C. in a 2-liter flask, was added 40 g. (0.11 mole) of recrystallized zinc n-butyl xanthate. The flask was fitted with a mechanical stirrer, reflux condenser, and an inlet for nitrogen. A clear solution was obtained in a few minutes. After about 20 minutes, a precipitate appeared and gradually increased in quantity. The reaction was allowed to proceed for one hour. After cooling, the precipitate was separated by centrifuging. It was thoroughly washed with benzene as in Example 1 and dried to yield 14.0 g. of a greenish-yellow powder [Component I]. Analysis: sulfur, 28.25%; zinc, 50.9%.

A 3.3 g. portion of the dried powder isolated above was suspended in 50 ml. dry benzene according to the method in Example 1. It was subsequently mixed with 1.04 g. of bulk triethylaluminum [Component II]. The atomic ratio of aluminum to zinc in the resulting catalyst dispersion was 0.37:1.

EXAMPLE 3

A 40 ml. (33.2 g.) portion of propylene oxide was polymerized with 3.14 ml. of the catalyst dispersion of Example 2 under nitrogen. The polymerization time was 26 hours and the temperature of polymerization was 50° C. The yield of dried polymer was 15.5 g. It had an inherent viscosity of 9.1 and 79% acetone-insoluble fraction. In another experiment, 40 ml. of propylene oxide was polymerized at 50° C. for 16 hours with 0.207 g. of the finely ground, greenish-yellow powder [Component I] prepared in Example No. 2. The yield of rubbery polymer was 33 g. It had an inherent viscosity of 6.7 and 40% acetone-insoluble fraction. These data show that when the polymerization was carried out in the presence of triethylaluminum, the poly(propylene oxide) obtained had significantly higher molecular weight and higher percentage of acetone-insoluble fraction than the corresponding values obtained when triethylaluminum was excluded.

EXAMPLE 4

To an 8-ounce bottle was transferred 10.0 g. zinc n-butyl xanthate, 5.06 ml. n-butyl alcohol, and 75 ml. of dry toluene (molar ratio of n-butyl alcohol/zinc n-butyl xanthate=2:1). The bottle was flushed with nitrogen, screw-capped, and placed for two hours in a water bath maintained at 90° C. The reaction mixture was transferred to a beaker and allowed to evaporate in a hood. The resulting pasty mass was mixed thoroughly with 200 ml. dry pentane. The pentane-insoluble fraction was separated on a filter paper, washed with pentane, and dried. After standing at room temperature for one week, it became insoluble in benzene. It was mixed thoroughly with 200 ml. dry benzene to isolate the benzene-insoluble fraction. The yield of the insoluble, greenish-yellow solid [Component I] was 3.8 g.

Propylene oxide was polymerized with the above Component I alone as well as with a catalyst of the present invention formed by mixing the Component I with triethylaluminum. Details of the polymerization and data on the properties of the propylene oxide polymers prepared with these two catalyst are shown in Table I. A comparison of the data shows that when the polymerization was carired out in the presence of triethylaluminum, the poly(propylene oxide) obtained possessed significantly higher molecular weight and higher percentage of acetone-insoluble fraction than the polymer obtained in the absence of triethylaluminum. In addition, the former polymer was more crystalline and hence more stereoregular than the latter polymer when X-ray crystallinity indices were compared for either the unfractionated polymers or their respective acetone-insoluble fractions.

EXAMPLES 5–10

The effect of atomic ratio of aluminum to zinc in the catalyst on the properties of poly(propylene oxide) is shown in Table II. A 4.0 g. portion of the greenish-yellow Component I prepared in Example No. 2 was dispersed in 100 ml. of a viscous solution of n-heptane containing 0.1 g. of a high molecular weight poly(propylene oxide). A 5.2 ml. of this dispersion, equivalent to 0.2 g. of Component I was used for each polymerization. The order of addition was the Component I dispersion followed by the triethylaluminum solution in heptane. After aging for one hour at room temperature, propylene oxide and heptane were added and polymerization allowed to proceed at 50° C. The data in Table II show that at Al/Zn atomic ratio of 0.44:1 to 4.4:1, the inherent viscosity and acetone-insoluble fraction of the polymers are significantly higher than the corresponding values obtained in the absence of triethylaluminum.

TABLE I.—POLYMERIZATION OF PROPYLENE OXIDE (A COMPARISON OF PROPERTIES OF POLYMERS PREPARED WITH TWO DIFFERENT CATALYSTS)

| Catalyst | Polymer yield, percent | Inherent viscosity | X-ray crystallinity index | Acetone-insoluble fraction Percent | Acetone-insoluble fraction X-ray crystallinity index |
|---|---|---|---|---|---|
| A | 46 | 4.4 | 23 | 24 | 39 |
| B | 24 | 6.5 | 32 | 48 | 52 |

Polymerization conditions: 16.6 g. propylene oxide, catalyst as indicated below (50° C., 47 hours):

Catalyst A: 1.65 g. of Component I (Example 4) was finely dispersed in 50 ml. dry benzene. A 3.1 ml. portion of this dispersion (equivalent to 0.1 g. of the Component I) was used for catalyzing the polymerization.
Catalyst B: 1.65 g. of the Component I (Example 4) was finely dispersed in 50 ml. dry benzene. To it was then added 0.625 ml. (0.52 g.) bulk triethylaluminum (Component II). A 3.6 ml. portion of the resulting mixture (equivalent to 0.115 g. of the Component I and 0.036 g. of triethylaluminum) was used for catalyzing the polymerization.

TABLE II.—POLYMERIZATION OF PROPYLENE OXIDE WITH BENZENE-INSOLUBLE REACTION PRODUCT OF ZINC n-BUTYL XANTHATE AND EXCESS n-BUTYL ALCOHOL: EFFECT OF ADDITION OF TRIETHYLALUMINUM

| Ex. No. | Ml. of triethyl-aluminum | Ml. of heptane | Atomic ratio [1] | Polymer yield, percent | Inherent viscosity | Acetone, insoluble percent |
|---|---|---|---|---|---|---|
| 5 | 0 | 2.0 | 0 | 70 | 8.0 | 36 |
| 6 | 0.10 | 1.9 | 0.44 | 19 | 8.2 | 40 |
| 7 | 0.30 | 1.7 | 1.32 | 17 | 10.5 | 52 |
| 8 | 0.50 | 1.5 | 2.20 | 25 | 14.9 | 65 |
| 9 | 1.0 | 1.0 | 4.40 | 13 | 12.5 | 58 |
| 10 | 2.0 | 0 | 8.80 | 13 | 8.0 | 38 |

[1] Aluminum/zinc atomic ratio in the mixture of Component I and triethylaluminum (Component II).
Conditions: 5.2 ml. of a dispersion of Component I, triethylaluminum and heptane as indicated, 33.2 g. propylene oxide. Total volume=47.2 ml. Polymerization at 50° C. for 17 hrs.

EXAMPLE 11

A 40 ml. (33.2 g.) portion of propylene oxide was polymerized under nitrogen with 1.34 ml. of the catalyst dispersion prepared in Example 1. The polymerization temperature was 25° C. and the time of polymerization was 21.75 hours. The yield of dried polymer was 23.2 g. It had an inherent viscosity of 9.7 and 53% acetone-insoluble fraction.

EXAMPLE 12

Freshly distilled phenyl glycidyl ether (20 ml., 22.2 g.) was polymerized under nitrogen in a 4-ounce bottle at 50° C. with 2 ml. of the catalyst dispersion prepared in Example 1. This catalyst dispersion was 15 weeks old at the time of the polymerization. Polymerization was continued for 150 hours. The solid polymeric mass was suspended in excess methanol. The insoluble polymer was separated and dried under vacuum to yield 14.1 g. of a highly crystalline material. A toluene-insoluble fraction of this polymer had a melting temperature of 201° C. as determined by differential thermal analysis.

EXAMPLE 13

A solution of 20 ml. (18.6 g.) of freshly distilled propylene sulfide and 60 ml. benzene was polymerized under nitrogen at 50° C. with 5.18 ml. of the catalyst dispersion prepared in Example 2. After 24 hours, the polymerized mass was precipitated in excess methanol. The polymer was isolated and dried under vacuum. The yield was 100%.

EXAMPLES 14–16

A mixture of 200 g. propylene oxide and 14.75 g. allyl glycidyl ether (molar charge ratio 96.5:3.5) was copolymerized at 50° C. with three different catalysts. The data are given in Table III. It is apparent that the catalyst prepared with triethylaluminum (Example 16) yields a rubbery copolymer having significantly higher molecular weight and higher percent acetone-insolubility than the other two rubbery copolymers prepared in the absence of triethylaluminum.

| | Vulcanization of copolymer | | |
|---|---|---|---|
| | Ex. 14 (Cat. A) | Ex. 15 (Cat. B) | Ex. 16 (Cat. C) |
| Tensile strength, p.s.i. | 2,310 | 2,800 | 4,030 |
| Elongation at break, percent | 520 | 540 | 500 |
| 100% modulus, p.s.i. | 213 | 210 | 301 |
| 300% modulus, p.s.i. | 588 | 610 | 1010 |
| 500% modulus, p.s.i. | 2,038 | 2,300 | 3,650 |

A plot of stress vs. strain shown in the accompanying drawing discloses that the curve for the vulcanizate from the rubbery copolymer made with Catalyst C exhibits a significantly greater upswing than the corresponding curves for vulcanizates of the other two rubbery copolymers made with Catalysts A and B. These data attest to greater structural regularity in the copolymer made with Catalyst C then the other two copolymers.

EXAMPLE 17

A homopolymer of propylene oxide was prepared according to the procedure of Example 3. It had an inherent viscosity of 10.5 and 72% acetone-insoluble fraction. This fraction had a swelling ratio of 4.4 in acetone. The latter measurement was carried out on a molded sample which had been allowed to age at 25° C. for 5 days.

The unfractionated homopolymer was compounded according to the following recipe:

| | Wt. parts |
|---|---|
| Poly(propylene oxide) | 100 |
| Di-cup 40 C [1] | 10 |
| Sulfur | 1 |

[1] Trademark of Hercules Company and contains 40 percent dicumyl peroxide.

Vulcanization was carried out by a curing in a press at 310° F. for 10 minutes. The stress-strain properties and solubility data on the gum vulcanizate are given below:

TABLE III

| Example Number | Catalyst | Polymerization time, hrs. | Copolymer yield, percent | Inherent viscosity | Swelling ratio | Acetone insoluble, percent |
|---|---|---|---|---|---|---|
| 14 | A | 49 | 100 | 6.2 | 21.5 | 23 |
| 15 | B | 117 | 76 | 4.6 | 13.0 | 24 |
| 16 | C | 117 | 82 | 9.7 | 9.2 | 66 |

(A) 1.22 g. of the greenish-yellow powder (Component I) of Example 2 was mixed with dry mineral oil to give a 4% dispersion.

(B) 1.22 g. of a catalyst synthesized by the reaction of zinc n-butyl xanthate and allyl alcohol in a manner analgous to the preparation of the powder (Component I) of Example 2. This catalyst was mixed with dry benzene to give a 4% dispersion.

(C) 18.8 ml. of the dispersion prepared in Example 2 was used as the catalyst. This amount is equivalent to 1.17 g. of the greenish-yellow powder (Component I) plus 0.35 g. of triethylaluminum.

The copolymers were compounded according to the following recipe:

| | Wt. parts |
|---|---|
| Copolymer | 100 |
| Stearic acid | 3 |
| Zinc oxide | 5 |
| Sulfur | 2 |
| Tuads [1] | 1 |
| Tellax [2] | 0.5 |

[1] Tetramethylthiuram disulfide.
[2] Tellurium diethyldithiocarbamate.

Gum vulcanizates were prepared by curing in a press at 310° F. for 30 minutes. The stress-strain data are given below:

| | |
|---|---|
| Tensile strength, p.s.i. | 4500 |
| Elongation at break, percent | 650 |
| 100% Modulus, p.s.i. | 380 |
| 300% Modulus, p.s.i. | 835 |
| 500% Modulus, p.s.i. | 2800 |
| Swelling ratio [1] | 5.8 |
| Percent solubiltiy [2] | 8.2 |

[1] Grams of toluene per gram of gel.
[2] In toluene solvent.

EXAMPLE 18

A 41 gram portion of 1,2-butene oxide was polymerized (50° C., 43 hours) with 3.13 ml. of the Catalyst A of Example 14. The reaction mixture was precipitated in excess methanol containing a small amount of PBNA. The yield of the rubbery polymer was 4.9 g. It had an inherent viscosity of 15.9.

While certain representative embodiments and details have been shown for the purpose of illustrating the invention, it will be apparent to those skilled in this art that various changes and modifications may be made therein without departing from the spirit or scope of the invention.

What is claimed:
1. In a catalyst composition of matter which comprises the metal-containing reaction product of (A) an alcohol, phenol or mercaptan and (B) a compound represented by the formula

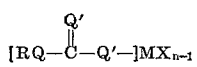

and wherein the molar ratio of (A) to (B) is between 0.1:1 and 100:1 and the reaction temperature is between about 25° C. and 300° C., the improvement which consists essentially of mixing with said catalyst a co-catalyst composition of matter represented by the formula $MR''_n$, wherein the atomic ratio of the metal in said metal-containing reaction product to the metal in $MR''_n$ is between .05 and 10, and wherein R represents a monovalent hydrocarbon, oxyhydrocarbon or thiohydrocarbon radical containing up to 10 carbon atoms R″ represents a monovalent hydrocarbon radical containing up to 14 carbon atoms Q represents oxygen or sulfur Q′ represents oxygen or sulfur and at least one Q′ in each molecule is sulfur M represents Zn, Cd, Mg or Al $n$ represents the valence of M X represents a monovalent halide, alkoxy, thioalkyl hydrocarbon radical or the radical represented by the formula

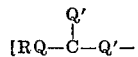

2. The composition of claim 1 wherein $MR''_n$ is trialkylaluminum.

3. The composition of claim 1 wherein $MR''_n$ is triethylaluminum.

4. The catalyst composition of claim 1 wherein (A) represents dimethylaminoethanol, (B) represents zinc-n-butyl xanthate, and $MR''_n$ represents triethylaluminum.

5. The catalyst composition of claim 1 wherein (A) represents n-butyl alcohol, (B) represents zinc-n-butyl xanthate, and $MR''_n$ represents triethylaluminum.

References Cited

UNITED STATES PATENTS

| | | | |
|---|---|---|---|
| 3,509,068 | 4/1970 | Lal | 252—431 |
| 3,542,698 | 11/1970 | Lal | 252—431 X |
| 3,409,565 | 11/1968 | Lal | 252—431 X |
| 3,444,102 | 5/1969 | Ito et al. | 252—431 N X |

PATRICK P. GARVIN, Primary Examiner

U.S. Cl. X.R.

252—431 N

PO-1050
(5/69)

UNITED STATES PATENT OFFICE
CERTIFICATE OF CORRECTION

Patent No. 3,649,561      Dated March 14, 1972

Inventor(s) Joginder Lal

It is certified that error appears in the above-identified patent and that said Letters Patent are hereby corrected as shown below:

Column 2, line 2, "akoxides" should read -- alkoxides --;
           line 5, "disscovered" should read -- discovered --;
           line 22, "high" should read -- higher --;
           line 58, "akoxy" should read -- alkoxy --;
           line 65, "1,2-epoxy-3-alloyloxypropane" should read -- 1,2-epoxy-3-allyloxypropane --;
           line 67, "1,1,2-tetramethyl" should read -- 1,1,2,2-tetramethyl --.

Column 3, line 66, "ethyl cadmium" should read -- ethylcadmium --.

Column 10, lines 4-7, in the Table at the top of the column, under Ex. 16 (Cat. C), the figures should read as follows:
$$4,010$$
$$530$$
$$310$$
$$1,000$$

line 17, "then" should read -- than --;
           line 34, "by a curing" should read -- by curing --;
           line 54, "solubiltiy" should read -- solubility --.

Column 11, line 25, in Claim 1, the formula $$[RQ-C-Q'-\overset{Q'}{\underset{|}{\phantom{C}}}$$

should read:

$$[RQ-C-Q'-]\overset{Q'}{\underset{||}{\phantom{C}}}$$

Signed and sealed this 7th day of November 1972.

(SEAL)
Attest:

EDWARD M. FLETCHER, JR.
Attesting Officer

ROBERT GOTTSCHALK
Commissioner of Patents